US012717590B2

(12) United States Patent
Prytkov et al.

(10) Patent No.: US 12,717,590 B2
(45) Date of Patent: Aug. 25, 2026

(54) SYSTEMS AND METHODS OF PULL-BASED ORCHESTRATION OF NODES IN A BLOCKCHAIN NETWORK

(71) Applicant: Chainstack Pte. Ltd., Singapore (SG)

(72) Inventors: Egor Prytkov, Tivat (ME); Aleksandr Brilliantov, Belgrad (RS); Evgeny Aseev, Singapore (SG); Laurent Dedenis, Singapore (SG); Serg Bell, Singapore (SG); Stanislav Protasov, Singapore (SG)

(73) Assignee: Chainstack Pte. Ltd., Singapore (SG)

( * ) Notice: Subject to any disclaimer, the term of this patent is extended or adjusted under 35 U.S.C. 154(b) by 116 days.

(21) Appl. No.: 18/648,800

(22) Filed: Apr. 29, 2024

(65) Prior Publication Data

US 2025/0335207 A1 Oct. 30, 2025

(51) Int. Cl.
*G06F 9/445* (2018.01)

(52) U.S. Cl.
CPC ................................ *G06F 9/44505* (2013.01)

(58) Field of Classification Search
CPC .................................................. G06F 9/44505
USPC ............................................................ 713/1
See application file for complete search history.

(56) References Cited

U.S. PATENT DOCUMENTS 5,487,066 A * 1/1996 McNamara ......... H04L 12/2801 370/410
7,054,924 B1 * 5/2006 Harvey ................. H04L 67/125 709/219
8,291,312 B1 * 10/2012 Zhou ..................... G06F 16/972 715/236
2004/0003247 A1 * 1/2004 Fraser ................... H04L 67/104 713/169
2005/0169195 A1 * 8/2005 Luo ..................... H04L 41/0806 370/254
2015/0072332 A1 * 3/2015 Lin .................... G06Q 30/0202 434/322
2018/0144156 A1 * 5/2018 Marin ................. G06F 21/6272
2020/0252213 A1 * 8/2020 Vijayan ................. G06F 16/275
2021/0184930 A1 * 6/2021 Mutnuru ................. H04L 45/02
2022/0129441 A1 * 4/2022 Waite ........................ G06F 9/54
2023/0195722 A1 * 6/2023 Bekiyants ........... G06F 16/9024 707/703
2024/0202054 A1 * 6/2024 Couillard ................ H04L 63/10

* cited by examiner

*Primary Examiner* — Paul R. Myers
(74) *Attorney, Agent, or Firm* — ESPE Legal Consultancy FZ-LLC

(57) ABSTRACT

Computer systems and methods with decentralized blockchain orchestration architecture use multiple orchestrators embedded at the cluster level. A push architecture is provided for manipulating and verifying workload configurations, including the ability to determine differences between stored configurations and actual configurations.

20 Claims, 5 Drawing Sheets

SYSTEMS AND METHODS OF PULL-BASED ORCHESTRATION OF NODES IN A BLOCKCHAIN NETWORK

TECHNICAL FIELD

This disclosure pertains to systems and methods of pull-based orchestration of nodes in a blockchain network.

BACKGROUND

The "push" model of deploying workloads (applications) relies on a centralized orchestration method from a single point in a blockchain network, such as from a centralized orchestrator. Push-based orchestration systems, where a central server actively sends updates to nodes, face significant scalability and network challenges, especially in large-scale environments. As the number of nodes grows, the central server can become a bottleneck, struggling to maintain connections and manage resources efficiently with an increasing load. This can lead to network congestion and high traffic, particularly when multiple nodes need simultaneous updates. Ensuring consistent and timely updates across all nodes can be difficult. If some nodes miss updates due to network issues or downtime, the system risks becoming inconsistent. Handling errors and rolling back changes also becomes complex in such scenarios, particularly when updates fail on some nodes but succeed on others. Improved systems and methods for orchestrating blockchain networks are needed to overcome these challenges.

SUMMARY

Systems and methods are disclosed for orchestrating a plurality of clusters comprising a plurality of blockchain nodes in a blockchain network using a plurality of cluster-level operators. An operator at a cluster scans the source of truth for changes and starts to deploy a new blockchain node on a cluster for participation in the blockchain network as this change is described in the source of truth. The operator retrieves blockchain network parameters and deployment requirements of the blockchain network. The operator determines a set of capabilities and configurations of the blockchain node and acts independently of other operators outside the cluster to control and upgrade the cluster and its workloads.

In an embodiment, a method for orchestrating a plurality of clusters comprising a plurality of blockchain nodes in a blockchain network employs a plurality of embedded, cluster-level operators and comprises a plurality of computing devices with non-transitory storage. An embedded operator at a cluster sends a request for a cluster infrastructure configuration by name to a configuration codebase. The cluster infrastructure configuration comprises an application. A content identifier (CID) of a file with the cluster infrastructure configuration is sent to the embedded operator. The embedded operator downloads the cluster infrastructure configuration. The operator applies applications from the cluster infrastructure configuration to an orchestration platform. The operator checks for changes in the cluster infrastructure configuration on a cooldown. The operator downloads a new, updated configuration and applies workloads from the new, updated configuration to the orchestration platform.

In an embodiment, Kubernetes is used to orchestrate one or more blockchain nodes.

In an embodiment, a configuration codebase for the cluster infrastructure is maintained at a source of truth.

In an embodiment, the source of truth is a version control system, such as git. In an alternative embodiment, the source of truth is established by a service discovery system. Alternatively, the source of truth can be established by an InterPlanetary File System (IPFS).

In an embodiment, a method for using decentralized storage for configurations from a source of truth uses a plurality of computing devices with non-transitory storage. A configuration codebase of an infrastructure is stored, and an operator is deployed to a cluster. The operator is configured to interact with a specific source of truth. The operator downloads the configuration codebase from the source of truth and applies the configuration codebase inside the cluster. The operator checks for changes in the source of truth on cooldown. The operator downloads any changes in the configuration codebase if a connection is established with the source of truth. The operator continues to work with the configuration codebase without changes if no connection is established with the source of truth.

In an embodiment, the source of truth is established by a version-control system, such as git. In an alternative embodiment, the source of truth is established by a service discovery system. In yet another embodiment, the source of truth is established by an InterPlanetary File System (IPFS).

In an embodiment, a system for decentralized storage for configurations from a source of truth uses a plurality of computing devices with non-transitory storage. The system comprises a configuration codebase of an infrastructure stored in the storage and an operator deployed in a cluster, wherein the operator is configured to interact with a specific source of truth. The system further comprises a configuration codebase downloaded by the operator from the source of truth and applied inside the cluster. A communication module is configured for checking, by the operator, for changes in the source of truth on cooldown. The operator is configured for using the communication module to check for any changes in the configuration codebase if a connection is established with the source of truth. The operator is further configured to work with the configuration codebase without changes if no connection is established with the source of truth.

In an embodiment, the source of truth is a version control system, such as git. In an alternative embodiment, the source of truth is established by a service discovery system. Alternatively, the source of truth can be established by an InterPlanetary File System (IPFS).

In an embodiment the cooldown is less than 5 minutes. Alternatively, the cooldown is more than 5 minutes.

In an embodiment, the operator is configured to download changes in the configuration codebase if a connection is established with the source of truth.

DETAILED DESCRIPTION

Figure 1:
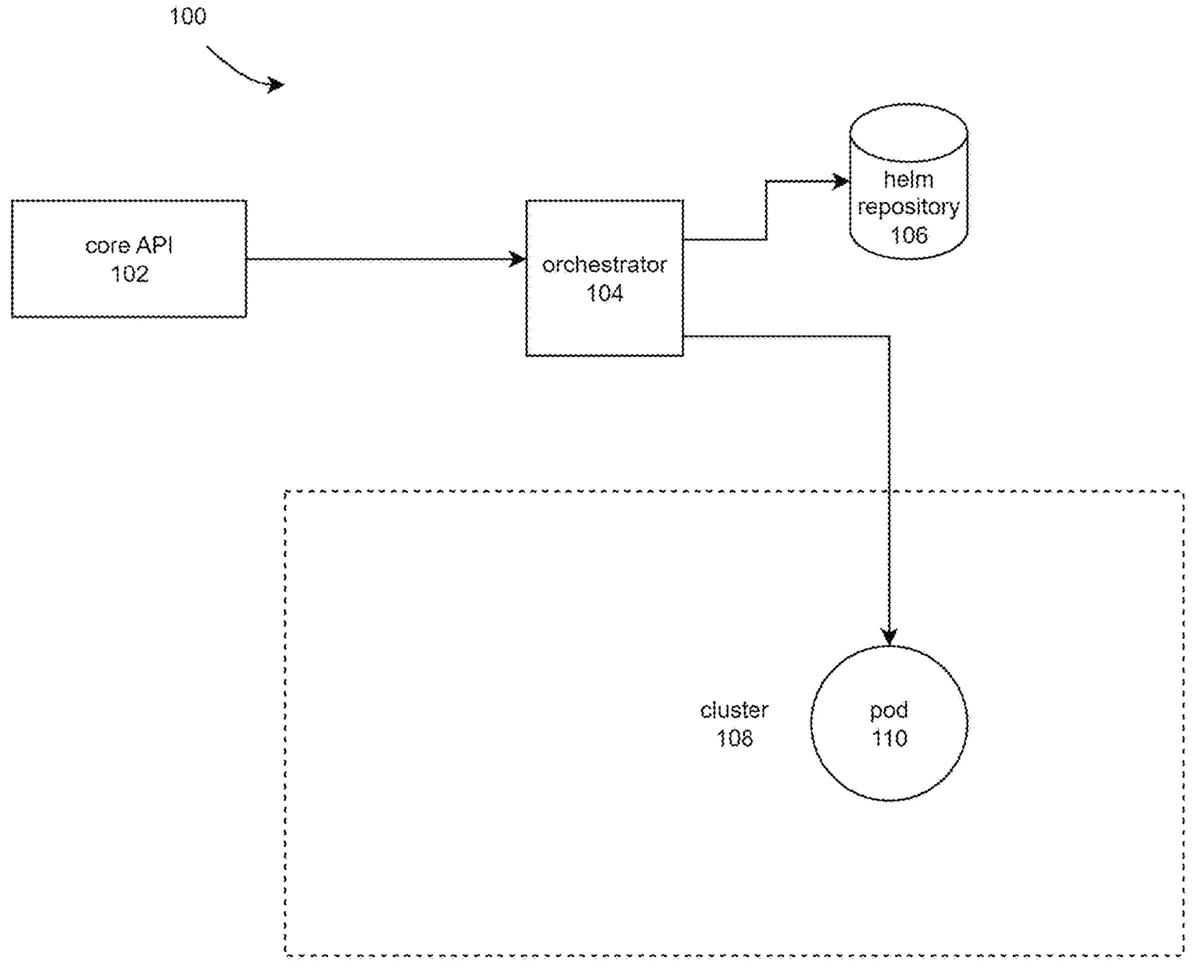
FIG. 1 is a block diagram showing a push model of deploying workloads with a centralized orchestrator, according to an embodiment.

Decentralized control of workload lifecycles is used to increase the ability to perform mass actions in a virtually unlimited set of blockchain nodes managed by various networks. A workload generally refers to applications and services, along with their supporting resources and configurations. A workload may comprise containers, which are the runtime instances of application images. These containers can be encapsulated within pods, comprising one or more containers that share storage, network, and specifications on how to run the containers.

Delivery speed is increased by reducing the amount of traffic between nodes across regions. Storing, manipulating and verifying workload configurations is enhanced by the ability to determine the differences between stored configurations and actual configurations. This decentralized architecture uses multiple orchestrators embedded near the nodes being managed.

To implement the orchestration system, exemplary hardware includes servers with high-end, multi-core CPUs and a significant amount of RAM, typically ranging from 32 GB to 128 GB, to effectively handle both orchestration processes and diverse application workloads. For storage, NVMe SSDs are ideal due to their high throughput and low latency, enhancing performance, particularly for data-intensive tasks. High-bandwidth network interface cards can be used for efficient inter-node communication. Specific, high-capacity servers can be allocated for some nodes with management duties or certain availability requirements, while other nodes can be configured differently based on their intended workloads. For example, some nodes can feature additional GPUs for compute-intensive tasks or extra RAM for memory-heavy applications. For high-availability configurations, redundant hardware and network components can be implemented, including dual network paths and switches, to maintain continuous operation and reliability under diverse load conditions.

In the blockchain context, orchestration involves deploying and configuring blockchain nodes. These nodes are instances running blockchain software. Orchestration comprises setting up the infrastructure, such as virtual machines or containers, and installing and configuring blockchain software.

The decentralized architecture employs multiple orchestrators, acting independently. This system architecture decreases latency by reducing the remoteness of data from nodes that need access to that data. Increased performance is derived from the orchestrators working internally inside groups of nodes. For example, nodes may be grouped into clusters, as in Kubernetes-based systems. With multiple orchestrators configured at the cluster level, responding to small workloads is more efficient than with a single, central orchestrator.

Dynamic workloads require a point of truth. In an embodiment, git can be used for version control. In some embodiments, however, a version-control system such as git may not be ideal. Git is fixed in time by state because it relies on versioning. In other embodiments, a service discovery system can be used. Service discovery is the process of automatically detecting devices and services on a computer network. A service discovery protocol (SDP) is an example of a network protocol that implements service discovery. Configurations are kept as BLOBs in a clustered solution. Blob storage is a type of cloud storage for unstructured data. A "blob," which is short for Binary Large Object, is a mass of data in binary form that need not conform to any specific file format. Blob storage can be used to keep data in non-hierarchical storage areas.

In an alternative embodiment, the InterPlanetary File System (IPFS) is used for establishing a point of truth. IPFS is a protocol, hypermedia, and file-sharing peer-to-peer network for storing and sharing data in a distributed file system. IPFS uses content-addressing to uniquely identify each file in a global namespace connecting IPFS hosts. IPFS allows users to host and receive content in a manner similar to BitTorrent. As opposed to a centrally located server, IPFS is built around a decentralized system of user-operators who hold a portion of the overall data. Using a decentralized system such as IPFS, configurations can be kept on a blockchain at a decentralized location.

The most recent configuration can be pointed to in a number of ways. For example, names or pointers such as IPNS, DNSLink, or ENS can be used. IPNS refers to the InterPlanetary Name System, which creates mutable pointers to CIDs known as names or IPNS names. IPNS names are links that can be updated over time, while retaining the verifiability of content addressing. A name in IPNS is the hash of a public key that is associated with an IPNS record containing the content path (/ipfs/CID). DNSLink is the specification of a format for DNS TXT records that allows the association of arbitrary content paths and identifiers with a domain. DNSLink leverages distributed DNS architecture for systems using internet scale mutable names or pointers. DNS (Domain Name System) is a hierarchical, decentralized naming system for computers, services, or other resources connected to the Internet or a private network. It translates domain names to IP addresses so that computers can communicate with each other. DNSLink uses DNS TXT records to map a DNS name to an IPFS address. A DNSLink address looks like an IPNS address, but it uses a DNS name in place of a hashed public key. ENS refers to Ethereum Name Service, a decentralized naming service built on the Ethereum blockchain that replaces addresses with human-readable names.

In an alternative embodiment, cloud object storage such as S3 Storage is used for a source of truth. S3 Storage is a cloud object storage service offered by Amazon Web Services (AWS). S3 storage typically stores data in buckets, where each bucket can store a virtually unlimited amount of unstructured data. S3 offers elastic scalability because S3 has no storage limit. Individual objects can be up to 5 TB in size.

In an embodiment, a decentralized pull architecture upgrades its source of truth, and all workloads will upgrade themselves, without relying on a version-control system. The trigger point of upgrades can be changed and, as a consequence of dynamic flow, workloads in the database clusters change accordingly. A customized, centralized controller is not used, and workload clusters are permitted to upgrade themselves.

As a result of decentralization, the system also can handle downtime locally. The system configuration decreases latency between deploying, completing, and maintaining workloads.

Responsibility for workloads is divided between multiple orchestrators. Thus, an orchestrator need not give responses for an entire global workload. The relatively small amount of workload assigned to each orchestrator ensures that response performance is enhanced. For similar reasons, failure conditions apply to only one cluster instead of the entire system. The decentralized system reduces the amount of data moving between nodes. For example, network packets can be reduced in size and counted in bytes instead of kilobytes.

In an embodiment, each orchestrator in a pull architecture is configured for write access only to its cluster and read-only access to the source of truth. In this security-focused embodiment, therefore, a compromised orchestrator exposes only a single cluster. In a push architecture, however, an orchestrator lacks this feature because it will typically have access to all environments.

In an exemplary embodiment, an orchestration tool such as Kubernetes is used. In Kubernetes, Application Program Interface (API) groups are a way to organize and manage endpoints. API groups provide a means to extend the API and introduce new resources and functionalities into the system.

In Kubernetes, a client is an application that interacts with the Kubernetes API server. The Kubernetes API server exposes the Kubernetes API. A client can be written in any compatible language, for example a language that supports HTTP and protocol buffers. Some examples of Kubernetes client libraries with official support include Go, Java, Python, Ruby, and C#. Kubernetes system architecture comprises a plurality of clusters with worker machines that run containerized applications. These worker machines are referred to in Kubernetes as "nodes." Every cluster has at least one worker machine. Worker machines host the pods that are the components of the application workload. A pod, in turn, is a group of one or more containers, with shared storage and network resources, and a specification for how to run the containers. A pod's contents are co-located and co-scheduled and run in a shared context. Thus, a pod models an application-specific logical host and contains one or more linked application containers.

Figure 2:
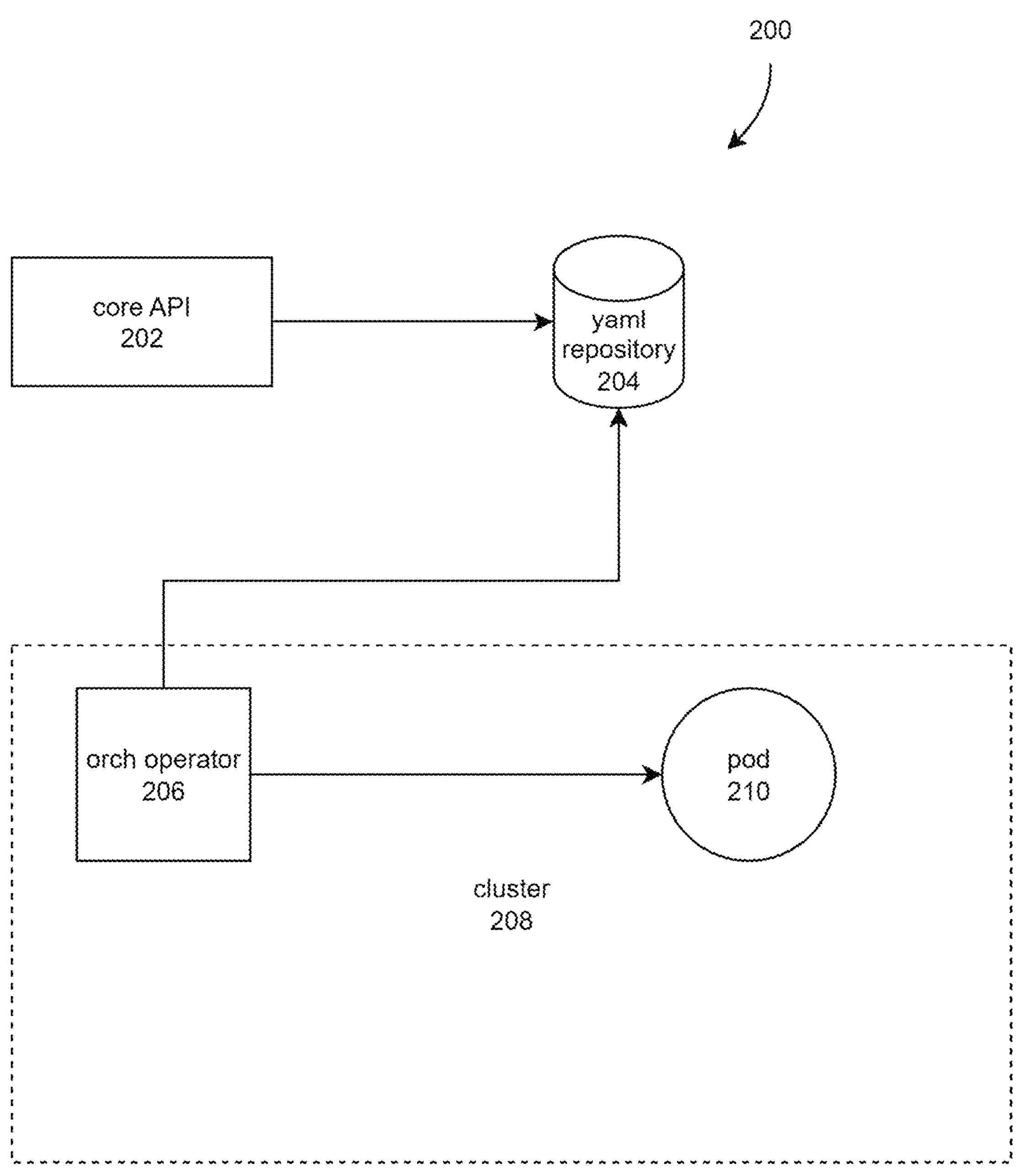
FIG. 2 is a block diagram showing an orchestration model with an orchestration operator at the cluster level, according to an embodiment.
Figure 3:
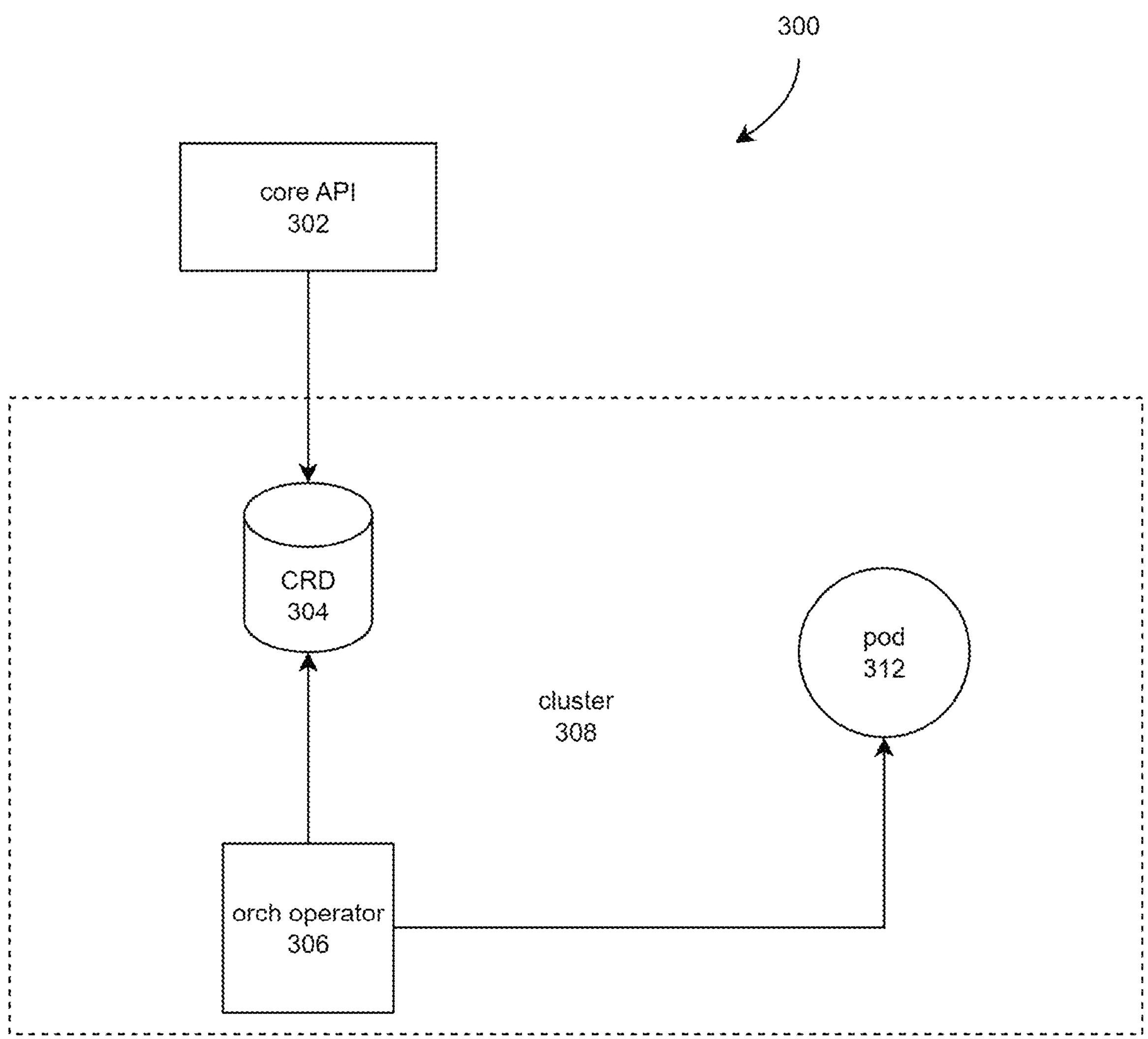
FIG. 3 is a block diagram showing a pull model of orchestration at the cluster level, according to an embodiment.

FIG. 1 shows typical known push architecture 100, in contrast to the pull architecture depicted and described in FIGS. 2 and 3. In this example, push architecture 100 comprises a core API 102 in communication with orchestrator 104. Orchestrator 104 in turn communicates with helm repository 106 and cluster 108 with pod 110. Workloads on cluster 108 and pod 110 are determined by orchestrator 104 under the direction of core API 102. Helm repository 106 provides a way to configure images inside the cluster by the cluster orchestrator internal mechanisms, which convert into a container or a pod with multiple containers and services for cluster 108 by way of orchestrator 104. In this configuration, orchestrator 104 controls workloads on cluster 108 from a remote location.

Core API 102 refers to a set of API resources and endpoints. Core API 102 serves as the primary interface for interacting with a cluster to manage and control its resources. Core API 102 provides a wide range of functionality for managing and operating the cluster. Users can access and manipulate cluster objects by making API requests to the API server. Core API 102 also enables the creation, deletion, and modification of pods. Pods encapsulate one or more containers and associated resources. Services provide a stable network endpoint to access a set of pods.

The push architecture of FIG. 1 includes container images that are pushed to a container registry (not depicted). An image pushed to the registry is available for retrieval by nodes and pods within a cluster. Container images are retrieved from the registry and deployed as part of the pod. When new versions of a container image become available in the registry, the push architecture typically requires manually launching rolling updates. This process replaces the existing pods with new ones using the updated images.

A package-management tool is also used in connection with the push architecture. In FIG. 1, for example, a Helm repository 106 is shown as an example of one possible implementation. Repository 106 stores and provides Helm charts. Helm is a package manager that simplifies the deployment and management of applications or services on a cluster. Helm charts are packages that contain all the necessary files, configurations, and dependencies required to deploy and configure a specific application. Helm repository 106 is therefore a centralized location where Helm charts are hosted and made available for installation and deployment.

FIG. 2 shows an embodiment of a decentralized pull architecture 200 at the cluster level that differs from the push architecture of FIG. 1. In an embodiment, pull architecture 200 generally comprises core API 202, YAML repository 204, orchestration operator 206 (of cluster 208), and pod 210 (of cluster 208). Core API 202 communicates with YAML repository 204. Orchestration operator 206, located on cluster 208, communicates with pod 210 as well as YAML repository 204.

Core API 202 includes resources like deployments and replica sets that facilitate the management of application deployments and scaling. Users can define desired state configurations, rollbacks, and scaling policies through core API 202. Namespaces provide a logical separation and isolation of resources within cluster 208. Core API 202 allows users to create and manage namespaces, enabling multi-tenancy and resource organization. Core API 202 also provides resources for managing persistent volumes and persistent volume claims. These allow for the storage and management of data that persists beyond the lifecycle of individual pods.

Core API 202 also includes resources and capabilities for managing authentication, access control, and security policies within a cluster. Users can define role-based access control (RBAC) rules, service accounts, and other security-related configurations.

YAML (YAML Ain't Markup Language) repository 204 comprises a version control repository that contains YAML files. YAML is a human-readable data serialization format used for configuration files and data representation in applications and systems. YAML repository stores 204 YAML files that define software project configuration and deployment. These YAML files can include specifications for Kubernetes manifests, CI/CD pipelines, application configurations, infrastructure-as-code definitions, and more.

YAML files provide a structured and declarative way to define settings and parameters, making them user-readable and editable. Storing these YAML files in a version control repository allows for versioning, collaboration, and tracking changes. YAML repository 204 thus serves as a single source of truth for defining and managing project configuration and infrastructure.

Alternatives to the YAML repository of FIG. 2 for configuration management and data storage include JSON (JavaScript Object Notation), TOML (Tom's Obvious, Minimal Language), XML (extensible Markup Language), and INI files (simple text-based configurations commonly used in Windows environments).

Orchestration operator 206 continuously monitors the desired state defined in the deployment configuration. When there is a discrepancy between the desired state and the actual state of the running pod 210, operator 206 takes action to reconcile differences.

Orchestration operator 206 manages pod 210. Orchestration operator 206 defines application-specific behavior, handles updates and upgrades, performs backup and restore operations, manages rolling upgrades, and handles pod failures.

Before creating new pods or updating existing pods, orchestration operator 206 automatically triggers the pull process. Orchestration operator 206 communicates with the container runtime of pod 210 and instructs it to pull container images from YAML repository 204. In an embodiment, orchestration operator 206 handles the desired state, as no new pods can be created or updates done before orchestration operator 206 pulls changes from the source of truth.

After a container image is pulled, pod 210 is scheduled to run in the cluster based on which resources are available and any predefined scheduling constraints. Pod 210 is monitored so that its lifecycle can be managed and automatically restarted if it fails or becomes unresponsive. If a new version of the container image becomes available in YAML repository 204, operator 206 performs updates. This process replaces pods 210 with a new pod using the updated image.

In a production environment, system 200 is one of a plurality of clusters also under the control of operators configured like orchestration operator 206. Thus, the pull architecture can be scaled as needed by the particular needs of each specific production environment.

FIG. 3 shows an alternative decentralized architecture 300 at the cluster level. In an embodiment, decentralized architecture 300 generally comprises core API 302, Custom Resource Definition (CRD) 304 (of cluster 308), orchestration operator 306 (of cluster 308), and pod 312 (of cluster 308). In this embodiment, core API communicates with CRD 304 and Orchestration operator 306. Both CRD 304 and orchestration operator 306 are located on cluster 308. Orchestration operator 306 also communicates with pod 312.

Events and notifications are generated about the state and changes in the cluster. Core API 302 provides endpoints for retrieving and monitoring events to gain visibility into the cluster's operations and troubleshoot issues. In an embodiment, Core API 302 follows the RESTful architectural style and is typically accessed using HTTP/HTTPS. Core API 302 is also extensible, and additional API resources and custom resources can be defined using API extensions like Custom Resource Definitions (CRDs). These allow Core API 302 to be extended with custom functionality and resources.

Custom resources are a group of resources defined by CRD 304. These resources are typically grouped under custom API groups, which can be created by users or third-party developers. These API groups introduce specialized resources for specific applications or domains. Operator 306 uses CRD to manage pod 312 within cluster 308.

Orchestration operator 306 communicates with Custom Resource Definition (CRD) 304. CRD 304 defines the structure and behavior of the custom resources that operator 306 manages and extends the API. Orchestration operator 306 also watches for changes to the custom resources and acts accordingly. Orchestration operator 306 reconciles the desired state of the resources with the actual state, ensuring that applications are running as intended on pod 312. Orchestration operator 306 can also include Custom Resource (CR) instances. CR instances of the custom resource are created by users or other components. CR instances represent the application or system that the operator manages.

Figure 4:
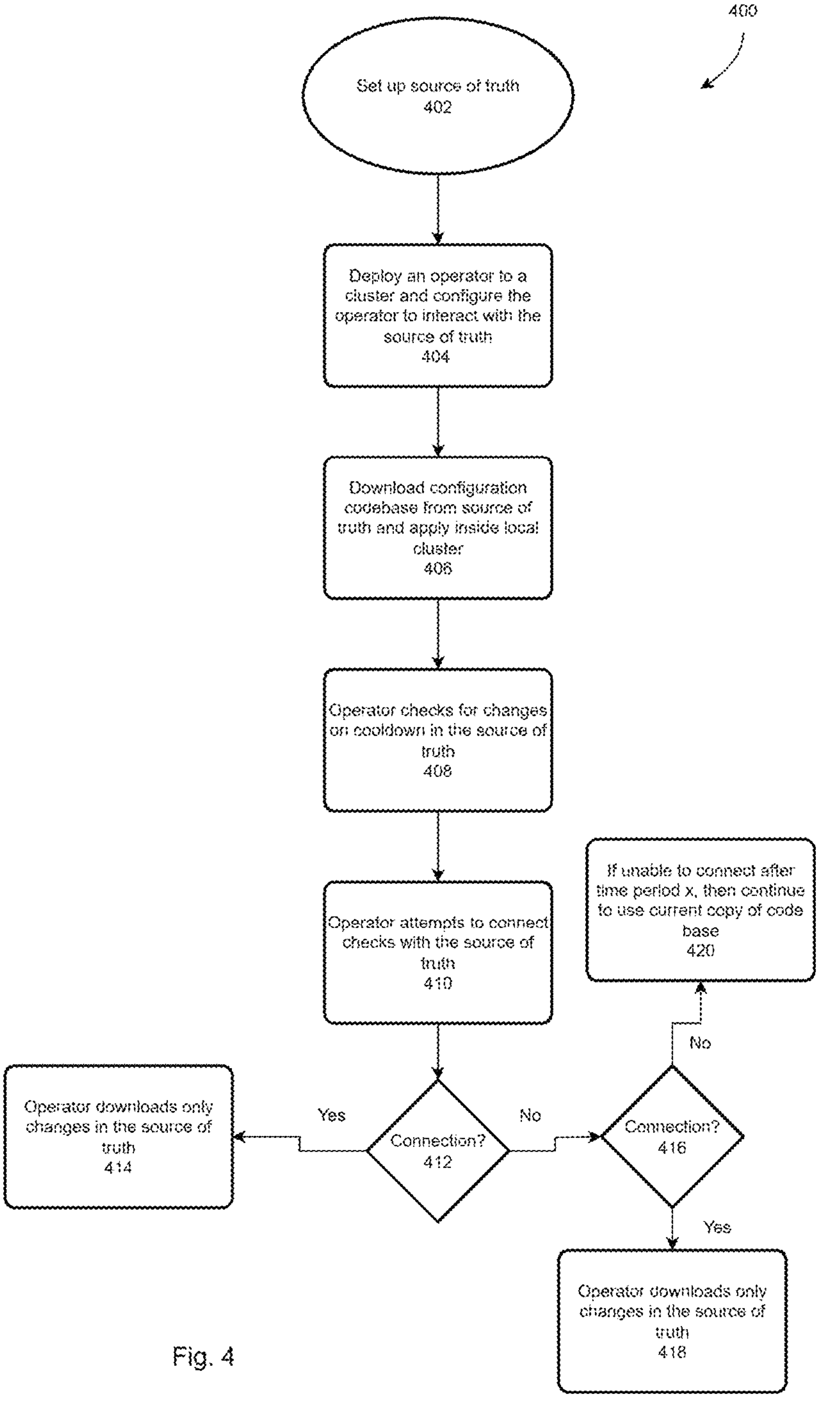
FIG. 4 is a flow diagram describing the steps for implementing an embodiment of a decentralized architecture, according to an embodiment.

FIG. 4 is a flow diagram describing the operations for implementing embodiment 400 of a decentralized architecture. At 402, the client sets up a source of truth, for example, git or IPFS, where the entire codebase of the infrastructure configuration is stored. At 404, the client deploys an operator to its cluster and configures the operator to interact with a specific source of truth. In an embodiment, a Kubernetes operator is used. The operator downloads the configuration codebase from the source of truth and applies it inside the local cluster at 406. At 408, the operator checks for changes in the source of truth on a predetermined cooldown. In alternative embodiments, a cooldown of 10 seconds, 30 seconds, or 10 minutes is used. In embodiments, shorter or longer cooldown durations can be used. An attempt is made to connect with the source of truth at 410. If a connection is made at 412 and there are changes in the source of truth, the operator downloads the changed codebase and applies it both in its entirety and in a "diff" at 414. A "diff" is a tool that compares two similar but different files side by side and shows what differentiates them. For example, the diff shows where new lines of code have been added, if variable names have been changed or if any lines of code have been removed. Alternatively, the codebase may be applied only in its entirety or only in the diff.

If there is no connection at 412, the operator tries again at 416 to connect to the source of truth and get the latest changes if available. If the source of truth is unavailable for a predetermined time x (or data is lost in it), the operator continues at 420 to work without any changes. The operator can do this because it has a complete copy of the code base.

Figure 5:
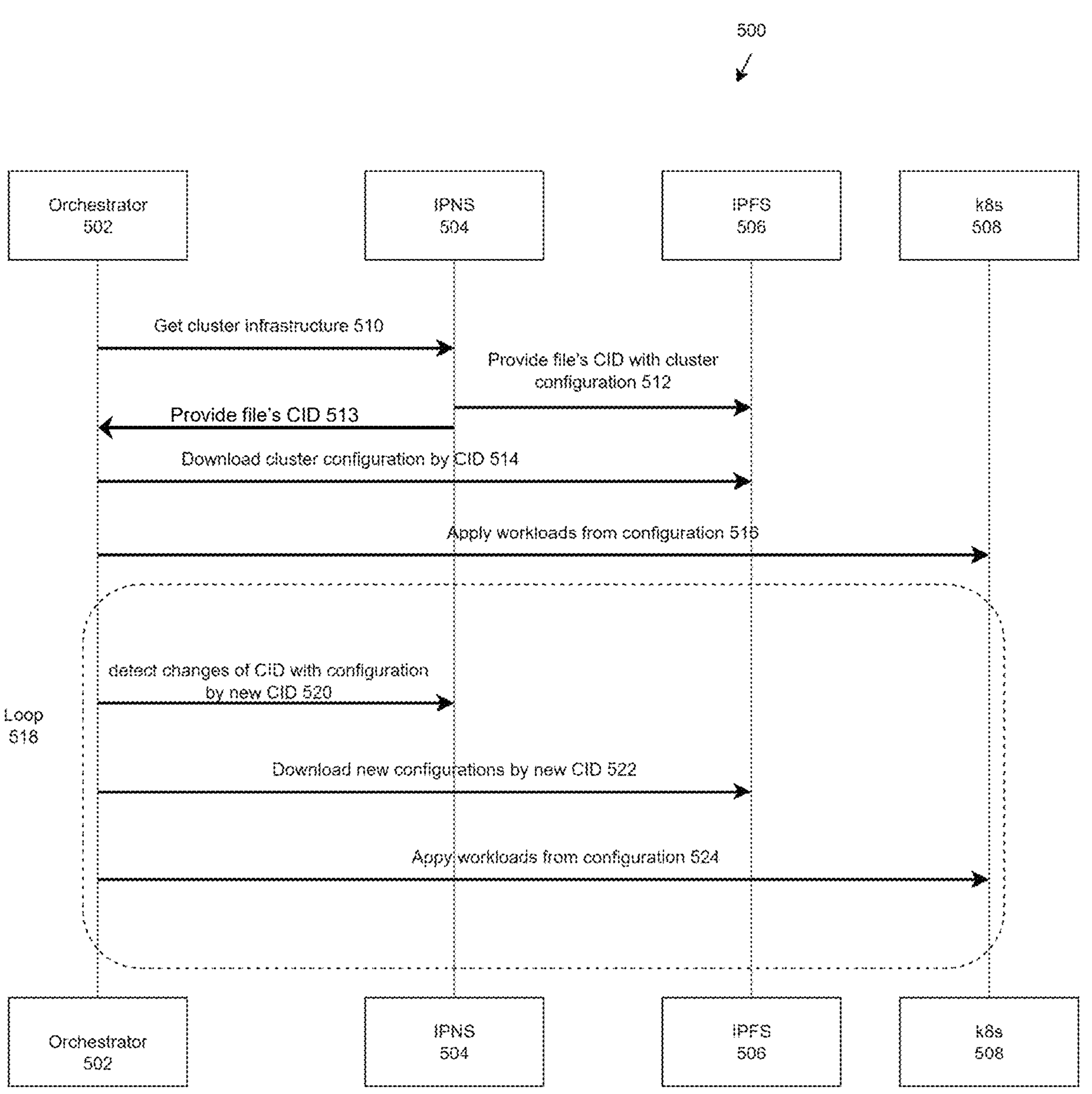
FIG. 5 is a sequence diagram of an embodiment of an orchestration system, according to an embodiment.

FIG. 5 is a sequence diagram of an exemplary embodiment of a Kubernetes orchestration system 500. The system comprises orchestrator 502, IPNS 504, IPFS 506, and Kubernetes (k8s) platform 508. At 510, orchestrator 502 gets cluster infrastructure configuration by name from IPNS 504. Then at 512, IPNS 504 provides a file's CID with cluster configuration to IPFS 506. At 513, IPNS 504 also provides the file's CID to orchestrator 502. Orchestrator 502 downloads cluster configuration by CID at 514. At 516, orchestrator 502 applies workloads (applications) from the configuration to Kubernetes platform 508. For example, a new pod can be configured, or an old pod updated.

Loop 518 watches for configuration changes. In an embodiment, the loop is repeated at regular, predetermined intervals. In an embodiment, the interval is 5 minutes. In embodiments, shorter or longer intervals can be used. Orchestrator 502 detects changes of CID with configuration by IPNS name at 520. At 522, orchestrator 502 downloads a new configuration by new CID. Then at 522, orchestrator 502 applies workloads (applications) from the configuration to Kubernetes platform 508. In exemplary system 500, decentralized storage is used for configurations that act as sources of truth for the system.

The invention claimed is:

1. A method for orchestrating a plurality of blockchain nodes in a blockchain network using a plurality of embedded, cluster-level operators and comprising a plurality of computing devices with non-transitory storage, the method comprising:

sending, by an embedded operator at a cluster comprising a blockchain node, a request for a first cluster infrastructure configuration by name to a configuration codebase;

wherein the first cluster infrastructure configuration comprises an application;

sending, by the configuration codebase, a contentID (CID) of a file with the first cluster infrastructure configuration to the embedded operator;

downloading, by the embedded operator, the first cluster infrastructure configuration;

applying, by the embedded operator, the application of the first cluster infrastructure configuration to at least one pod in the cluster;

checking, by the embedded operator, for changes in the cluster infrastructure configuration;

downloading, by the operator, a second cluster infrastructure configuration; and applying, by the operator, an application from the second configuration to the at least one pod in the cluster.

2. The method of claim 1, wherein Kubernetes is used to orchestrate one or more blockchain nodes.

3. The method of claim 1, wherein the configuration codebase for the cluster infrastructure configuration is maintained at a source of truth.

4. The method of claim 3, wherein the source of truth is a version control system.

5. The method of claim 4, wherein the version-control system is git.

6. The method of claim 3, wherein the source of truth is established by a service discovery system.

7. The method of claim 1, wherein the source of truth is established by an InterPlanetary File System (IPFS).

8. A method for using decentralized storage for configurations from a source of truth in a blockchain network using a plurality of computing devices with non-transitory storage, the method comprising:

storing a configuration codebase of an infrastructure;

deploying an operator to a cluster comprising a node in a blockchain network;

configuring the operator to interact with a specific source of truth;

downloading, by the operator, the configuration codebase from the specific source of truth and applying the configuration codebase inside the cluster;

checking, by the operator, for changes in the source of truth;

downloading, by the operator, changes in the configuration codebase if a connection is established with the source of truth; and continuing, by the operator, to work with the configuration codebase without changes if no connection is established with the source of truth.

9. The method of claim 8, wherein the source of truth is established by a version-control system.

10. The method of claim 9, wherein the version-control system is git.

11. The method of claim 8, wherein the source of truth is accessed by way of a service discovery system.

12. The method of claim 8, wherein the source of truth is accessed by way of an InterPlanetary File System (IPFS).

13. A system for decentralized storage in a blockchain network for configurations from a source of truth using a plurality of computing devices with non-transitory storage, the system comprising:

a configuration codebase of an infrastructure stored in a database;

an operator deployed on a cluster comprising a node in a blockchain network, wherein the operator is configured to interact with a specific source of truth;

a configuration codebase downloaded by the operator from the source of truth and applied inside the cluster;

a communication module for checking, by the operator, for changes in the source of truth on cooldown;

wherein the operator is configured for using the communication module to check for any changes in the configuration codebase if a connection is established with the source of truth, and wherein the operator is further configured to work with the configuration codebase without changes if no connection is established with the source of truth.

14. The system of claim 13, wherein the source of truth is established by a version-control system.

15. The system of claim 14, wherein the version-control system is git.

16. The system of claim 13, wherein the source of truth is accessed by way of a service discovery system.

17. The system of claim 13, wherein the source of truth is accessed by way of an InterPlanetary File System (IPFS).

18. The system of claim 13, wherein the cooldown is less than 5 minutes.

19. The system of claim 13, wherein the cooldown is more than 5 minutes.

20. The system of claim 13, wherein the operator is configured to download changes in the configuration codebase if a connection is lost and then re-established with the source of truth.

* * * * *